Nov. 25, 1958  T. M. A. LIPS ET AL  2,861,460
AUTOMATICALLY VARIABLE GEARING DEVICE
Filed Nov. 28, 1952

INVENTORS
THEODOOR MARIA ALBERT LIPS
MARTINUS JOHAN SPIERING
WILHELMUS LAMBERTUS VERVEST
BY

AGENT

Nov. 25, 1958  T. M. A. LIPS ET AL  2,861,460
AUTOMATICALLY VARIABLE GEARING DEVICE
Filed Nov. 28, 1952  6 Sheets-Sheet 2

INVENTORS
Theodoor Maria Albert Lips
Martinus Johan Spiering
Wilhelmus Lambertus Vervest
BY
Fred M. Vogel
AGENT Nov. 25, 1958  T. M. A. LIPS ET AL  2,861,460
AUTOMATICALLY VARIABLE GEARING DEVICE
Filed Nov. 28, 1952  6 Sheets-Sheet 3
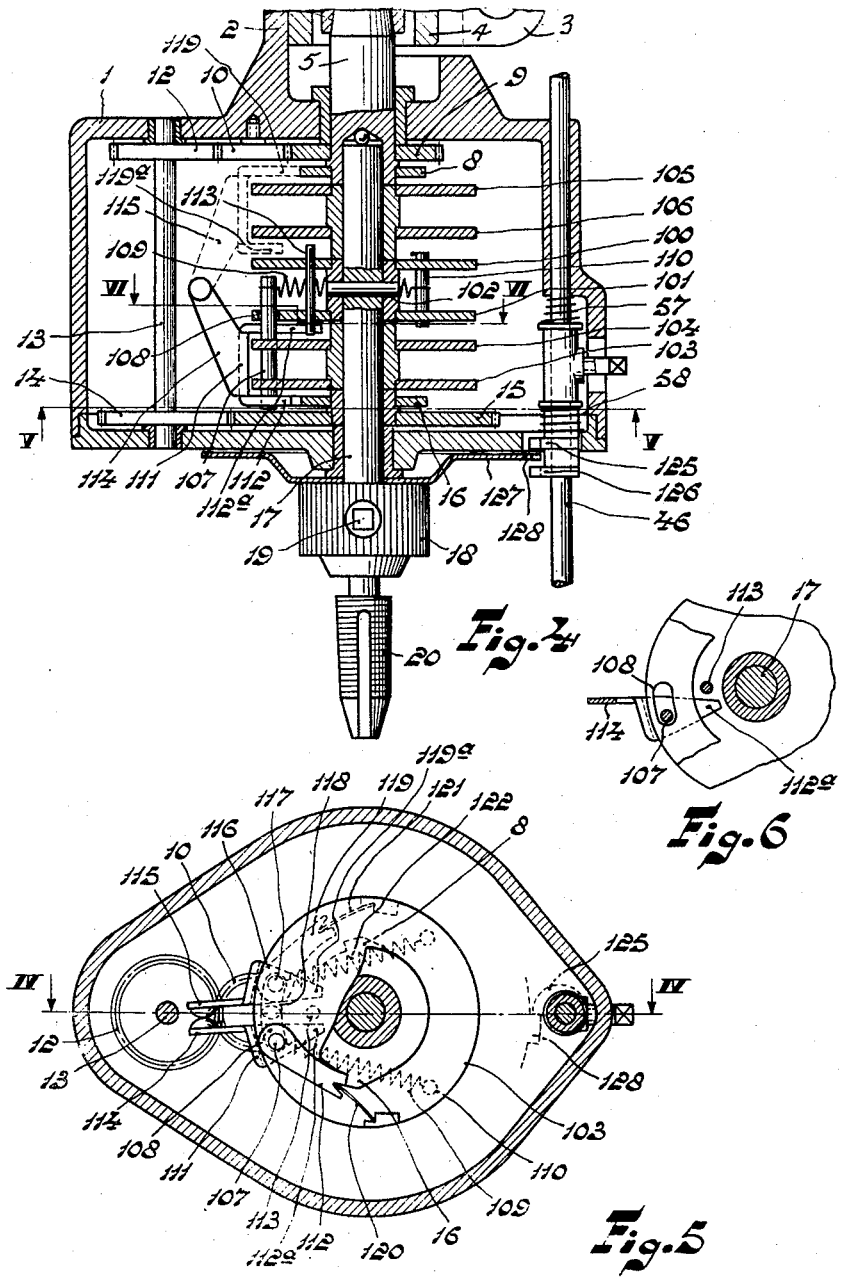
INVENTORS
Theodoor Maria Albert Lips
Martinus Johan Spiering
Wilhelmus Lambertus Vervest
BY
AGENT Nov. 25, 1958  T. M. A. LIPS ET AL  2,861,460
AUTOMATICALLY VARIABLE GEARING DEVICE
Filed Nov. 28, 1952  6 Sheets-Sheet 4
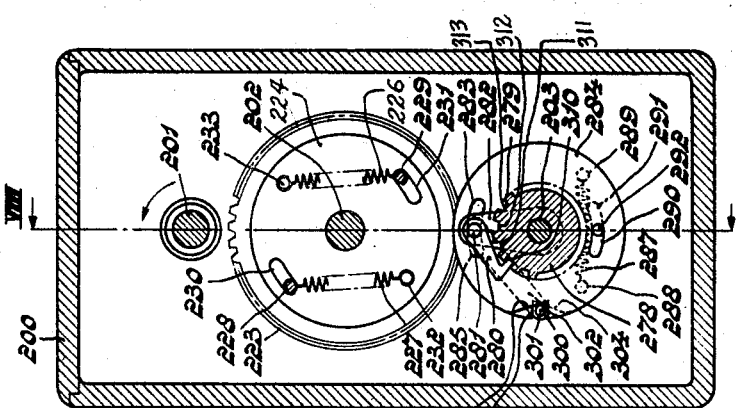
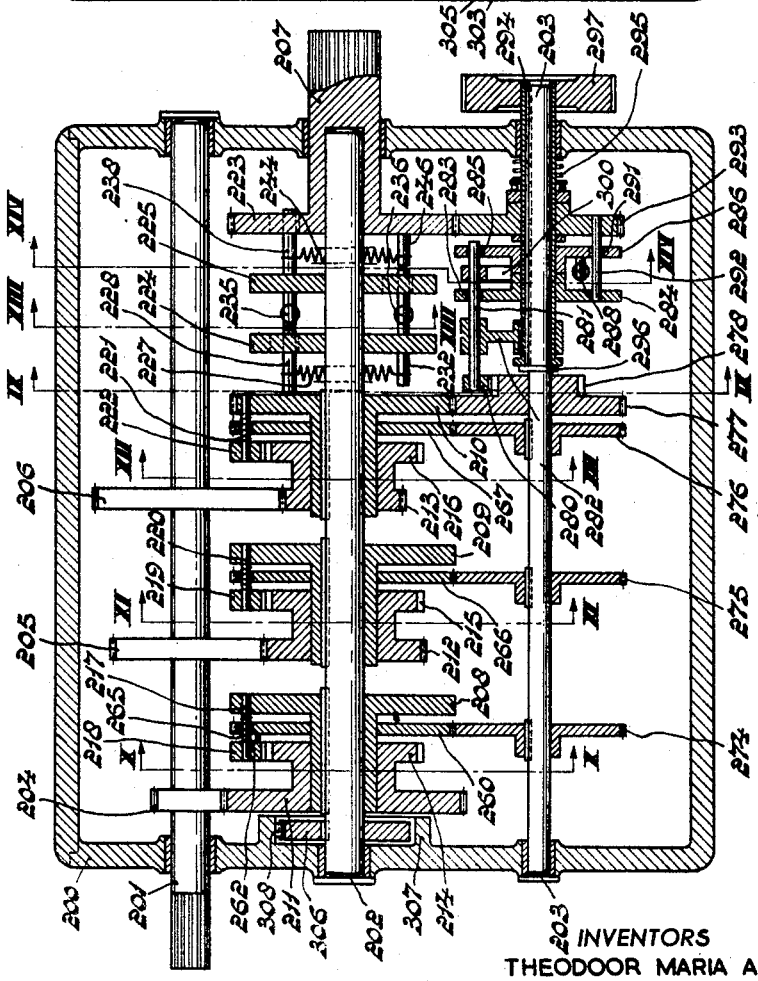
INVENTORS
THEODOOR MARIA ALBERT LIPS
MARTINUS JOHAN SPIERING
WILHELMUS LAMBERTUS VERVEST
BY
AGENT Nov. 25, 1958     T. M. A. LIPS ET AL     2,861,460
AUTOMATICALLY VARIABLE GEARING DEVICE Filed Nov. 28, 1952     6 Sheets-Sheet 5

INVENTORS
THEODOOR MARIA ALBERT LIPS
MARTINUS JOHAN SPIERING
WILHELMUS LAMBERTUS VERVEST
BY

AGENT

Nov. 25, 1958 T. M. A. LIPS ET AL 2,861,460
AUTOMATICALLY VARIABLE GEARING DEVICE
Filed Nov. 28, 1952 6 Sheets-Sheet 6

INVENTORS
THEODOOR MARIA ALBERT LIPS
MARTINUS JOHAN SPIERING
WILHELMUS LAMBERTUS VERVEST
BY

AGENT

United States Patent Office 2,861,460
Patented Nov. 25, 1958

2,861,460

AUTOMATICALLY VARIABLE GEARING DEVICE

Theodoor Maria Albert Lips, Martinus Johan Spiering, and Wilhelmus Lambertus Vervest, Hilversum, Netherlands, assignors, by mesne assignments, to North American Philips Company, Inc., New York, N. Y., a corporation of Delaware Application November 28, 1952, Serial No. 322,894

Claims priority, application Netherlands January 11, 1952

14 Claims. (Cl. 74—337)

The invention relates to a gearing device having automatic variation of the gear ratio between the inlet and the outlet. In engineering a great number of cases are found in which it is desirable to vary the gear ratio between a driving device and a device to be driven thereby with respect to the operational conditions. This is, for example, the case in machine tools in which, with a constant speed of the driving motor the speed of the parts to be driven must be variable relative to the nature of the working of the piece. A further example is found in transport means in which the output power should be adapted to the power of the driving device. It is, moreover, often desirable to reverse the direction of movement of the device to be driven without the need of reversing the direction of movement of the driving device, if this were possible at all. In all these cases use is made of gear devices having a variable gear ratio between the inlet coupled with the driving device and the outlet coupled with the device to be driven. It should be noted that the reversal of the direction of movement of the outlet, the direction of movement of the inlet being the same, is to be considered herein as a variation of the gear ratio.

Gearing devices are known in which the gear ratio between the inlet and the outlet is automatically adjusted in accordance with the momentary operational conditions of the gearing device. Particularly with motor vehicles, for example, gearing devices are known in which the gear ratio is varied as a function of the speed of the inlet or of the outlet. It is also known that the gear ratio of gearing devices may be caused to vary continuously with the load of the output, so that the load of the driving device is favourably affected.

The invention has for its object to provide a gearing device having automatic variation of the gear ratio between the inlet and the outlet, the variation being determined by the load of the gearing device constituted by the device to be driven, coupled with the outlet.

The gearing device according to the invention is characterised in that by way of a plurality of different gearing members a plurality of driving members is coupled with the inlet, each of these driving members being adapted to be coupled, through a separate controllable clutch, referred to hereinafter as driving clutch, with an auxiliary member which is connected resiliently with the outlet in a manner such that, the outlet being driven through a driving clutch and the auxiliary member concerned, the output being loaded to a definite limit value determined by the resilient connection, the driving force from the inlet displaces the auxiliary member relatively to the outlet against the force of the resilient connection, provision being made of means by which, owing to this relative displacement of the auxiliary member and the outlet, the operating driving clutch is disengaged and another driving clutch is actuated.

The gearing device according to the invention may be constructed in a manner such that each driving clutch is associated with a separate auxiliary member connected resiliently with the outlet. The gearing device may, however, also have a construction such that all driving clutches co-operate with the same auxiliary member connected resiliently with the outlet.

The means by which the driving clutches are switched on or switched off are such that, but for the time of any commutation from one driving clutch to the other not more than one driving clutch is switched on.

The gearing device according to the invention is very suitable for use in machine tools and the like, in which the tool with which any piece of work is worked must be safeguarded. For this purpose the gearing device may be constructed in a manner such that if a definite load of the cutting motion of the tool or of the piece of work is exceeded, a gearing is introduced which produces a relative movement of the tool and the piece contrary to the initial cutting motion. This is particularly of importance in tapping screw-threads and in drilling. If the tool experiences a strong resistance, the variations of the gear ratio, in the gearing device according to the invention, by way of which the tool is driven, this variation being produced by the load, reverses the movement of the tap or the drill, so that fracture of the tool owing to overload is avoided and the tool is moreover, withdrawn from the piece of work, while the direction of movement of the driving device remains the same. The gearing device is then preferably arranged in a manner such that also for the reversed movement of the outlet it is load-sensitive. This may be effected in a manner such that an excessively strong resistance for the reversed movement produces again commutation of the gearing device to the initial onward movement. If, for the two directions of movement, the load of the tool remains in excess of the limit load at which the gearing device reacts, this device continues commutating. Such a gearing device is very suitable for use in a tool holder, for example, a tap or drill holder, which may simply be inserted into a conventional drilling machine or other machine tool.

In order that the invention may be readily carried into effect, it will now be described in detail with reference to the accompanying drawing, in which Fig. 1 shows a tool holder in a longitudinal sectional view, the holder being shown opened for the greater part; this holder comprises one embodiment of the gearing device according to the invention and Fig. 2 is a sectional view taken on the line II—II of Fig. 1, various parts being broken away.

Fig. 4 is a longitudinal sectional view of a second tool holder in which another embodiment of the gearing device according to the invention is incorporated and Fig. 5 is a cross-sectional view taken on the line IV—IV of Fig. 4.

Fig. 6 is part of the cross sectional view taken on the line VI—VI of Fig. 4.

Fig. 8 is a longitudinal sectional view of one embodiment of a gearing device according to the invention, having three different possible gearings between the inlet and the outlet.

Fig. 9 is a sectional view taken on the line IX—IX of Fig. 8.

Figure 1:
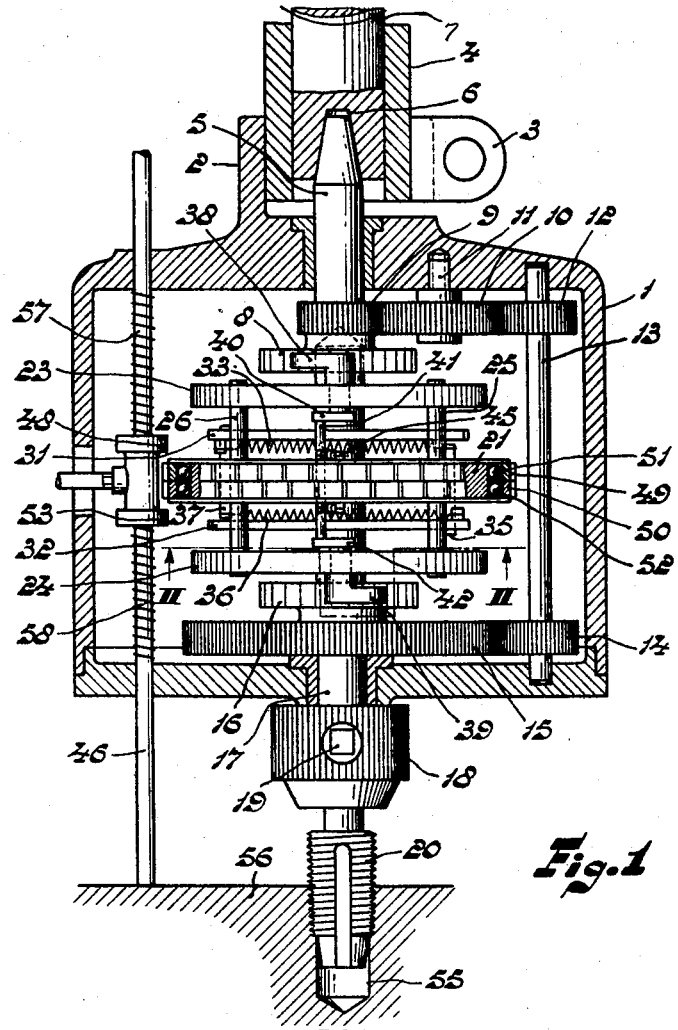

Referring to Fig. 1, reference numeral 1 designates the housing of a tool holder, a top neck part 2 of which is secuerd by clamps 3 to a guiding spindle 4 of a drilling machine. The housing 1 comprises a gearing device according to the invention, the input of which is constituted by a conical shaft 5, the conical portion of which fits in a central conical aperture 6 in the drilling spindle 7 of the drilling machine. The shaft 5, which is journalled centrally in the upper cover of housing 1, is provided at the end remote from the drilling spindle with a ratchet wheel 8. On the shaft 5 is, moreover, seated a toothed wheel 9, which engages a toothed wheel 10, which is rotatable about a shaft 11 secured in the upper wall of the housing 1. The toothed wheel 10 engages a toothed wheel 12, which is seated on a shaft 13, which is parallel to the shaft 5 and the ends of which are journalled in the upper cover and the bottom cover of the housing 1 respectively. The shaft 13 is provided at the bottom end with a second toothed wheel 14, which engages a toothed wheel 15, which is freely rotatable about a shaft 17, constituting the outlet of the gearing device, and being journalled rotatably in the cover at the bottom of the housing 1. With the toothed wheel 15 is connected the ratchet wheel 16, which is located over the wheel 15.

Outside the housing 1 the shaft 17 is provided with a clamp 18, having a radial fixing screw 19, by the turning of which a tap 20 is fixed centrally in the clamp.

The other end of the shaft 17 is journalled in a central cavity of the ratchet wheel 8. On the portion of the shaft 17, located between the two ratchet wheels 8 and 16, is seated a disc 21, fixed by means of a key 22. The shaft 17 is, moreover, provided with an auxiliary member constituted by two discs 23 and 24, provided one on each side of the disc 21 and rigidly secured to one another by means of three axial connecting rods, 25, 26 and 27. These rods extend through apertures 28, 29 and 30 in the disc 21. Between each of the discs 23 and 24 which are freely rotatable about the shaft 17, is seated on the shaft 17 so as to be freely rotatable, a catch 31 and 32 respectively. The catch 31 is connected to the disc 21 by means of a spring 33, which is wound about a stud 35, connected with the disc 21. The catch 32 is connected by way of a spring 36 with a stud 37, secured on the other side to the disc 21. The springs 33 and 36 exert moments on their catches concerned tending to rotate these catches in opposite directions. Since the catch 32 bears on the connecting rod 26 and the catch 31 on the connecting rod 25, the auxiliary member formed by the interconnected discs 23 and 24 is held resiliently in an intermediate position relative to the disc 21. If the auxiliary member is rotated counter clock-wise relatively to the disc 21 as viewed in Fig. 2, the auxiliary member is subjected to a counteracting directional force by the connecting rod 26, cooperating with the catch 32. At this rotation the catch 31 remains at rest, since the left-hand bottom end is held by the stud 37. With clockwise rotation relative to the disc 21, the auxiliary member is exposed to a counteracting force exerted by the spring 33, connected with the catch 31, whereas the catch 32 remains at rest, since now the right-hand bottom end thereof is held by the stud 35.

The disc 23 supports a rotatable pawl 38, which is adapted to co-operate with the ratchet wheel 8. The disc 24 supports a pawl 39, which is adapted to co-operate with the ratchet wheel 16. Owing to the reversing mechanism formed by the toothed wheels 9, 10, 12, 14 and 15 between the ratchet wheels 8 and 16 the latter have opposite directions of rotation and hence the ratchet teeth of these ratchet wheels have opposite directions.

The shafts of the pawls 38 and 39 are each provided on the innerside of the discs 23 and 24 with an arm 40 and 42 respectively, which are connected with one another by a shaft 41, which is taken through an aperture 43 in the disc 21. The angular positions of the pawls 38 and 39 is such that, if the pawl 38 co-operates with its ratchet wheel, the pawl 39 is lifted and conversely. For reversing the pawls, the shaft 41 is displaced from one side of the plane through the aligned pawl shafts and the central line of the shaft 17 to the other side. To the shaft 41 is secured on each side of the disc 21 a toggle spring 44; the other ends of these springs are secured to a stud 45, which projects on each side of the disc 21 and is located in the plane of the pawl shafts and the central line of the shaft 17.

Figure 2:
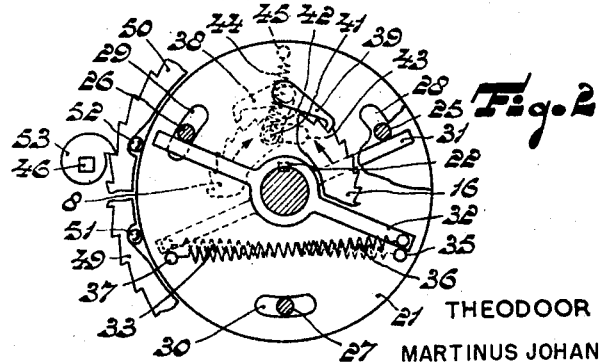

In the housing 1 is arranged a stop stud 46, displaceable in an axial direction, a double lug being secured thereto. The double lug consists of a lug 48, which is adapted to co-operate with the external ratchet teeth of a ring 49, which embraces the edge of the disc 21, which is also embraced by a second ring 50. Between the ring 49 and the disc 21 provision is made of arresting balls 51, which are housed in cavities having slanting bottoms. Together with their races on the disc 21 and the ring 49 these balls constitute a freewheel clutch, which permits the disc 21 to rotate only to the right relatively to the ring 49 (Fig. 2). By co-operation with the teeth on the periphery of the ring 49, the lug 48 can stop a movement of the disc 21 counter clockwise as seen in Fig. 2.

The ring 50 is also coupled with the edge of the disc 21 through a freewheel clutch having balls 52; this clutch prevents the disc 21 from rotating clockwise relatively to the ring 50. By displacing the stop stud 46 the ring 50 may be arrested through a lug 53, which constitutes the second lug of the double lug displaceable by the stud 46 and which is spaced apart by a certain distance from the lug 48. For this stopping the ring 50 is provided externally with teeth, which have a direction opposite that of the teeth of the ring 49.

Figure 3:
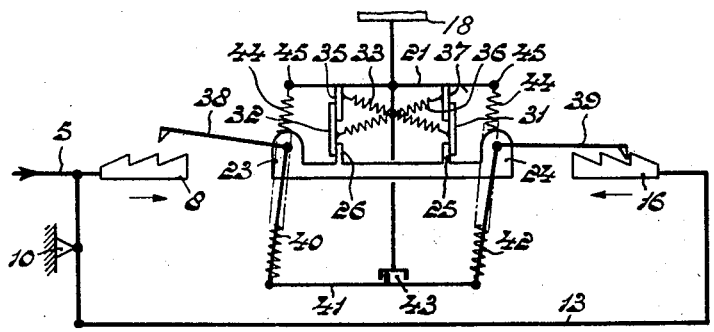
Fig. 3 is a diagrammatical view of the gearing device incorporated in the tool holder shown in Figs. 1 and 2; the actual rotary movements being interpreted in the diagram as translatory movements.
Figure 7:
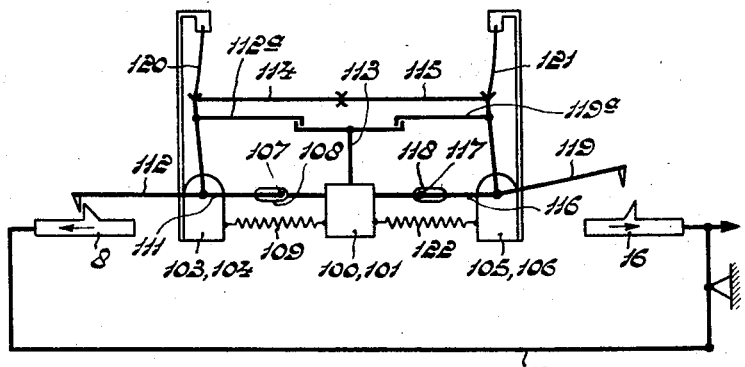
Fig. 7 is a diagrammatical view of the gearing device incorporated in the tool holder shown in Fig. 4.

The operation of the device described above will now be explained with reference to Fig. 3. This figure shows diagrammatically the gearing device according to the invention, housed in the tool holder shown in Fig. 1. In order to facilitate a good understanding, it is assumed herein that we are concerned with the transmission of translatory movements; in reality the various parts, such as input, auxiliary member and output of the gearing device shown in Figs. 1 and 2 are adapted to rotate. The reference numerals of Fig. 3 are the same as those of Figs. 1 and 2.

It is first assumed that no overload of the tool, in this case the tap 20, occurs and that tapping is performed in clockwise rotation, viewed from above. The auxiliary member formed by the interconnected parts 23 and 24 thus occupies the intermediate position, indicated above, relatively to the disc 21 on the outlet shaft 17, the two catches 31 and 32 then bearing on the studs 37 and 35 respectively.

The pawl 39 engages the ratchet wheel 16 and the pawl 38 is lifted from the ratchet wheel 8. This position is shown in Fig. 2. The hole 55 in the piece of work 56 (Fig. 1) is thus provided internally with screw-thread. If the tap 20 is withheld by the bottom of the hole 55 or if another hindrance occurs, so that the resistance for the tap increases, the following occurs, as soon as this load exceeds the moment exerted by the spring 36. The outlet shaft 17 and the disc 21 lag behind the auxiliary member constituted by the discs 23 and 24, the catch 32 being caught by the connecting rod 26 against the force of the spring 36. At this relative displacement of the auxiliary member and the outlet the connecting element 41, which connects the two arms of the pawls, shifts to the left (Fig. 2) in the aperture 43. Then the direction of the toggle springs 44 relative to the axis of rotation of the pawls 38 and 39 is at the same time changed to such an extent that these springs tend to reverse the pawls 38 and 39. This is, however, provisionally prevented by the pressure which the tooth of the ratchet wheel 16, co-operating with the pawl 39, exerts on this pawl. During the continued relative displacement of the auxiliary member and the outlet the connecting element 41 strikes the left-hand boundary of the aperture 43, so that the pawls 38 and 39 are rotated about their shafts, and the pawl 39 releases the ratchet wheel 16. At this moment, since the pressure of the tooth on this pawl falls out, the resilient force of the toggle springs 44 is capable of reversing completely the pawls, so that the latter take up a position in which the pawl 39 is completely free from the ratchet wheel 16 and the pawl 38 engages the ratchet wheel 8. Since the ratchet wheel 8 has a direction of movement opposite that of the ratchet wheel 16, the auxiliary member is taken along in opposite direction, the relative displacement of the auxiliary member and the outlet being neutralized and the auxiliary member taking up its initial position relative to the output, if this has not yet been effected after the pawl 39 has been lifted under the action of the spring 36.

By way of the catch 31 and the spring 33 the output is now also moved in the opposite direction of movement.

However, if the resistance to be overcome by the tap during the latter movement exceeds the moment exerted by the spring 33, a relative displacement of the auxiliary member driven through the ratchet wheel 8 and the pawl 38 and the disc 21 on the output shaft 17 occurs again. This relative displacement, which is contrary to the relative displacement which gave rise to the engagement of the pawl 38, now results in that the pawls 38 and 39 are again reversed owing to the co-operation of the connecting element 41 with the right-hand boundary of the aperture 43 (Fig. 2). This reversal is prepared by the displacement of the points of application 45 of the toggle springs 44 in a direction such that the moment exerted by these toggle springs acts in the direction of the desired reversal. In the case of overload of the tap in counter clockwise rotation (viewed from above) the movement is reversed to clockwise rotation; this reversal is performed quite similarly to the initial reversal from clockwise to counter clockwise rotation.

If during the normal tapping operation, the tap 20 jams, the direction of movement of the tap will, as is described above, be reversed owing to the high resistance experienced. As a rule, the tap will be moved in the new direction of movement. However, this requires often at first a moment which slightly exceeds the moment at which reversal of the initial movement occurred. Therefore the spring 36 is slightly stronger than the spring 33. Consequently, it will, as a rule, be possible to withdraw the tap from the hole without difficulty. Since the transmission during the reverse movement does not take place through a retarding gear system, as is the case for the onward movement, the reverse movement of the tap is performed more rapidly than the onward movement. This saves time.

If the tap jams and is held so tightly that the reverse movement experiences a resistance such that again reversal of the pawls 38 and 39 occurs, the tap is exposed to a jerking movement, which, in many cases, results in disengagement of the tap, which is then withdrawn from the hole 55 without renewed disengagement of the pawl 38. However, if the tap is held so tightly that no movement is any longer possible, the gearing device in the housing of the tap holder continues reversing and this is an indication for the operator to intervene. As is evident from the above, the gearing device always operates in a manner such that on the tap itself, a driving force exceeding the moment determined by the spring 36 or 33 respectively, cannot be exerted so that a very suitable protection of the tool is obtained.

The stop stud 46, to which the double lug 48, 53 is secured, is adapted to provide automatically a reversal of the direction of movement of the tap or other tool clamped in the holder. If, for example, a hole in a piece of work should be provided with screw-thread over a definite length, the position of the double lug on the stop stud 46 may be adjusted in a manner such that, when the tap has been worked into the piece to the desired length, the bottom end of the stud 46 is engaged by the piece of work or another stop in a manner such that the lug 53 engages the toothed edge of the ring 50, which it arrests. Thus also the clockwise movement of the disc 21 is arrested, so that in the manner described above, by the reversal of the pawl system 38 and 39, owing to relative displacement of the auxiliary member and the output, the direction of movement of the disc 21 is reversed. The balls 52 between the ring 50 and the disc 21 permit the disc 21 to rotate freely in the new direction, so that the movement of the tap is reversed, if the resistance experienced thereby does not exceed the moment exerted by the spring 33. At the withdrawing movement of the tool holder the stop stud 46 takes up its initial position under the action of the springs 57 and 58, which hold the stud in the medium position, in which medium position none of the lugs 48 and 53 co-operates with the rings surrounding the disc 21. When the tap is out of the hole the rotation may again be reversed by causing the top end of the stop stud 46 to abut against a stationary part of the drilling machine or by pressing this stud down by hand. Thus the lug 48 co-operates with the ring 49, so that the disc 21 is arrested for counter clockwise rotation. This blocking results in that the pawl system 38, 39 is again reversed and the gearing device causes the tap to rotate again in the initial direction.

In the tool holder described above the two pawls 38 and 39, which are adapted to couple the auxiliary member alternately with a driving ratchet wheel, are interconnected by means of the connecting member 41, which is controlled by the edges of the aperture 43, a certain amount of play being provided between this connecting member and these edges. However, the gearing device may be provided with two separate auxiliary members, each of which may be coupled through a switchable clutch with a driving part, the coupling elements not being rigidly connected with one another. One embodiment of such a gearing device is shown in Figs. 4 to 7. These figures show also a tool holder, intended for two opposite directions of rotation. Since this holder differs from that shown in Figs. 1 to 3 only in the construction of the auxiliary member and the pawls provided thereon and the connection of the auxiliary member with the output shaft, only these parts and their co-operation will be described. Those parts which are identical with the parts of the tool holder described with reference to Figs. 1 to 3, are designated by the same reference numerals.

On each side of two interconnected discs 100 and 101, rigidly seated on the shaft 17 by means of a transverse key 102 two separate auxiliary members, each of which consists of two interconnected discs 103 and 104, 105 and 106 respectively, are both freely rotatable about the output shaft 17. The two discs 103 and 104 support an axial stud 107, which extends through a slit-shaped aperture 108 in the disc 101 and to the end of which is connected a spring 109, the other end of which is wound about a stud 110, which is fixed in the two discs 100 and 101. The stud 107 is also the pivot of a U-shaped pawl 111, one limb 112 of which is adapted to co-operate with the teeth of the ratchet wheel 16, whereas the other limb 112a is adapted to co-operate with an axial stud 113, which is fixed in the discs 100 and 101. The central piece of the U-shaped pawl 111 supports an arm 114, which co-operates with an arm 115 of a pawl 116 (Fig. 5) as the pawl 111 of similar construction which is supported by a stud 117 in the discs 105 and 106. The stud 117 extends through an aperture 118 in the disc 100. The pawl 116 has a portion 119 which is adapted to engage the teeth of the ratchet wheel 8, and a portion 119 adapted to be engaged by the stud 113. The two pawls 111 and 116 are each under the action of a curved blade spring 120 and 121 respectively, in a manner such that in the extreme positions of the pawls the springs hold them in the positions occupied, whereas, when the pawls are reversed, they pass through a labile intermediate position. The stud 117, which constitutes the shaft of rotation for the pawl 116, is also connected by a spring 122 with the two discs 100 and 101. In the unloaded conditions shown of the gearing device, the stud 113 is free between the limbs of the two U-shaped pawls at the side of the discs 100 and 101. The pawl 111 engages the ratchet wheel 16, whereas the pawl 116 is lifted, its arm 115 bearing on the arm 114 of the pawl 111. The tap 20 is, under these conditions of the gearing device, moved by the shaft 5 through the toothed wheels 9, 10, 12, 14, 15 the pawl 111, the stud 107, the spring 109 and the two discs 100 and 101. In the case of overload of the tap a relative displacement of the auxiliary member constituted by the discs 103 and 104 and the discs 100 and 101, including the stud 113, seated on the output shaft 17 occurs. Then, owing to the co-operation with the inward limb of the pawl 111, the stud 113 will move this pawl out of the tooth of the ratchet wheel 16, the pawl 116 being then also rotated by way of the arms 114 and 115. The labile position of this pawl, which is determined by the blade spring 121, is now such that the pawl 116 is passed through this labile position before the pawl 111 has been completely disengaged from the adjacent tooth of the ratchet wheel 16. If the pawl 116 has passed the labile position, the blade spring 121 urges the pawl onwards, so that the latter co-operates with the ratchet wheel 8. It may occur that at this instant a tooth of the ratchet wheel 16 does not immediately engage the pawl 116; in this interval the pawl 111 is completely lifted, owing to the continued relative displacement of the auxiliary member 103, 104 and the output, after which the spring 120 provides that the pawl 111 takes up that extreme position where it is completely free from the ratchet wheel 16. However, even if a tooth of the ratchet wheel 8 engages immediately the actuated pawl 116, the pawl 111 is completely lifted, since the driving force transmitted by the pawl 116 and the spring 122 to the output then provides an increase in load of the outlet, which causes the relative displacement of the output and the auxiliary member 103, 104 to increase rapidly, so that the stud 113 ejects the pawl 111 completely. The load of the tool, which, by exceeding the moment exerted by the spring 109, caused a relative displacement of the auxiliary member 103, 104 and the output, causes the pawl 111 to be lifted and the pawl 116 to take up its operative positive. Since in this case also the ratchet wheels 8 and 16 have opposite directions of movement, the tap will be rotated in a direction opposite the initial direction. If the load in this new direction of rotation exceeds the moment determined by the spring 122, the pawl 116 will be lifted in a similar manner, the pawl 111 being re-engaged. In the tap holder shown in the Figs. 4 to 7 a reversal of the direction of movement of the tap clamp may be obtained from the outside either with the aid of a stop or by hand, by means of a stop stud 46, which is displaceable in an axial direction from a medium position determined by springs 57 and 58. This stud supports two lugs 125 and 126, which are adapted to co-operate alternately with a disc 127, provided with a lug 128, which is secured to the output shaft 17. The lugs 125 and 126 are connected in a manner not shown with the stop stud 46 so that they can be rotated in relatively opposite directions about this shaft from an operative position against a spring force. The lug 125, for example, is rotatable in anti-clockwise direction (Fig. 5), so that, if this lug is moved into the path of the stop 128, it blocks a movement of the shaft 17 in anti-clockwise direction, but permits this shaft to rotate in opposite direction, since then the stop 128 pushes the lug on in front of it and then passes by. Conversely the lug 126 blocks only a movement of the shaft 17 in clockwise direction, if, owing to the displacement of the stop stud 46, this lug is moved into the path of the stop 128.

Figure 15:
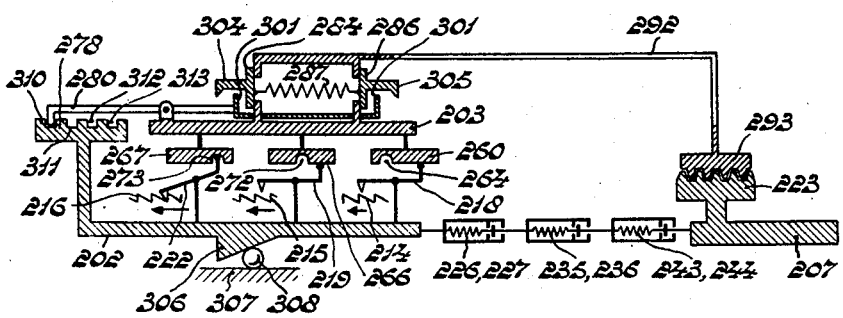
Fig. 15 is a diagrammatical view of the principle of the gearing device shown in Figs. 8 to 14, the rotary movements being also assumed to be translatory movements as with the diagrammatical figures of the embodiments described above.

The Figs. 8 to 14 show one embodiment of an automatically operating gearing device according to the invention, having three different gearings. Fig. 15 shows this gearing device quite diagrammatically.

The device comprises a housing 200, in which three shafts 201, 202 and 203 are journalled parallel to one another. The shaft 201 constitutes the input of the gearing device and three toothed wheels 204, 205 and 206 are seated thereon; the diameter of these wheels increases in the order mentioned. The right-hand end of the shaft 202 is journalled in a central cavity of a shaft portion 207, which constitutes the output of the gearing device. By means of keys, three pawl carriers 208, 209 and 210, of which the latter is provided with teeth at the periphery are seated on the shaft 202. A sleeve of each pawl carrier, surrounding the shaft 202, supports rotatably a toothed wheel. With each of these toothed wheels, designated by 211, 212 and 213, is connected a ratchet wheel 214, 215 and 216 respectively. The toothed wheel 212 engages the toothed wheel 205 while a pawl 219 is adapted to co-operate with the ratchet wheel 215, connected with the toothed wheel 212. The pawl 219 is supported rotatably by a shaft 220, which is fixed in the pawl carrier 209, which supports rotatably the toothed wheel 212, connected with the ratchet wheel 215. The pawl carrier 210 similarly supports a pawl shaft 221, on which a pawl 222 is seated rotatably, and adapted to co-operate with the ratchet wheel 216, which is coupled through the toothed wheel 213 with the toothed wheel 216.

By means of three series-connected pairs of springs of different pre-tension, the pawl carrier 210 is connected with the output 207 of the gearing device. Between the pawl carrier 210 and the left-hand portion 223 of the output 207, constructed in the form of a toothed wheel, are rotatably seated on the shaft 202 two loose discs 224 and 225. The pawl carrier 210 and the disc 224 are connected with one another by a set of springs 226 and 227, one end of each of which is secured to a stud 228 and 229, respectively, connected with the pawl carrier 210 and extending through a slit 230 and 231 respectively in the disc 224. The other ends of the springs 226 and 227 are secured to a stud 232 and 233 respectively, each of which is secured to the disc 224 and projects on each side thereof.

A set of springs 235 and 236 is provided between the discs 224 and 225. One end of the spring 235 is secured to the stud 233, secured in the disc 224, and extending through an aperture 237 in the disc 225. The other end of the spring 235 is secured to a stud 238, which is fixed in the disc 225 and extends, on the other side thereof, through an aperture 239 in the toothed wheel 223. The spring 236 connects the stud 232, extending through an aperture 240 of the disc 225, with a stud 241, connected to the disc 225 and extending on the other side thereof through an aperture 242 of the toothed wheel 223.

The disc 225 is resiliently connected in a similar manner with the toothed wheel 223, since two springs 243 and 244 are secured to the studs 238 and 241 respectively in the disc 225 and to two studs 245 and 246, secured in the toothed wheel 223. The whole assembly of springs and discs between the pawl carrier 210 and the toothed wheel 223, the latter being integral with the outlet 207 of the gearing device, constitutes a resilient coupling, which allows the pawl carrier 210 to move relatively to the toothed wheel 223, this movement being counteracted by spring force. In the case of clockwise rotation (Figs. 9, 13 and 14) such a rotation of the pawl carrier relative to the toothed wheel 223 takes place in three successive steps. First that pair of springs will be stretched, of which the moment is smallest, owing to the resilient pre-tension which holds, in the inoperative position, the studs movable in a slit in the extreme left-hand position. This stretching ends, when the studs to which these springs are secured cannot move further in the slit-shaped apertures concerned in the adjacent part. Then the pair of springs becomes operative, of which the moment exceeds that of the first pair, but is smaller than that of the third pair of springs. Consequently, the moment required for this relative displacement of the pawl carrier 210 and the toothed wheel 223 gradually increases; in accordance with the pre-tension of the springs, this increase may even take place by jumps.

The pawl carrier 208 supports rotatably a pawl-selecting toothed wheel 260, which is provided with a slit-shaped aperture 261, through which extends the shaft 217 of the pawl 218. The pawl 218 is provided with a stud 262, which extends through an aperture 263 in the pawl-selecting toothed wheel 260, this aperture having locally a radial widening 264, directed to the outside. About the shaft 217 is wound a helical spring 265, which is secured to the pawl 218, which it urges with the left-hand end (Fig. 10) towards the ratchet wheel 214. Together with the stud 262, the edge of the aperture 263 prevents the pawl 218 from co-operating with the ratchet wheel 214, if the pawl-selecting toothed wheel 260 does not take up a position relative to the pawl carrier 208 such that the stud 262 is capable of moving to the outside in the widening 264 of the slit 263.

The pawl carriers 209 and 210 are also provided with a rotatable pawl-selecting toothed wheel 266 and 267 respectively, by which the pawls 219 and 222, supported by these pawl carriers, are controlled in a similar manner by means of a stud 270 and 271 respectively, these studs extending in a slit-shaped, locally widened aperture 268 and 269 respectively in the pawl-selecting toothed wheels concerned. The widenings of the slit-shaped apertures, provided in order to cause the pawls to co-operate with their associated ratchet wheels under the action of the helical springs (not shown) acting thereon, are designated by 272 and 273 and have different positions in the slits. The three pawl-selecting toothed wheels 260, 266 and 267, having equal diameters, engage the toothed wheels 274, 275 and 276, each of which is secured by means of a key to the shaft 203.

About this shaft is rotatable a toothed wheel 277, which has the same diameter as the toothed wheels 274, 275 and 276 and which engages the pawl carrier 210, the diameter of which is equal to that of the pawl-selecting toothed wheels 260, 266 and 267. A pawl wheel 278, having rectangular teeth 279 is integral with the toothed wheel 277. With this pawl wheel is adapted to co-operate a pawl 280, which is seated on a shaft 281, journalled rotatably in a support 282 secured to a sleeve 294 about the shaft 203. A prolongation of the pawl shaft 281 extends through a slit 283 in a disc 284 and through a slit 285 in a disc 286, these two discs being supported rotatably by the sleeve 294 and coupled with one another by means of a tension spring 286, which connects a stud 288 on the disc 286 with a stud 289 on the disc 284. The slits 283 and 285 extend in opposite directions from the part in which the shaft 281 is located in the position shown in Fig. 9. The discs 284 and 286 have each a second slit-shaped recess 290 and 291 respectively, through which extends a stud 292, which is secured to a toothed wheel 293, which is also supported rotatably by the sleeve 294 and which engages the toothed wheel 223. The diameters of the toothed wheels 277 and 293 are equal. The sleeve 294, which is adapted to move axially along the shaft 203, but which cannot rotate relatively to this shaft, is urged against a shoulder 296 on the shaft 203 by means of a helical spring 295, which bears on the right-hand wall of the housing 200. By means of a knob 297, secured to the sleeve 294, the latter can be displaced to the right against the action of the spring 295, so that the pawl 280 is disengaged from the pawl wheel 278 and the toothed wheel 293 is disengaged from the toothed wheel 223. In this position the whole system of elements supported by the sleeve 294, together with the shaft 203 and the pawl-selecting toothed wheels 274, 275 and 276, connected thereto, can be rotated independently of the wheels 210 and 223. If the knob 279 is then left free, the pawl 280 engages, in its new position, the toothed wheel 278 and the toothed wheel 293 cooperates with the toothed wheel 223 of the outlet of the gearing device.

Between the discs 284 and 286 is seated on the pawl shaft 281 an arm 300, in the end of which a stud 301 is provided, which stud co-operates with the edges of the discs 284 and 286. Each of these discs has a recess 302 and 303 respectively, having a sloping edge 304 and 305 respectively, the slopes of these edges having opposite directions. In the normal position the stud 301 is under the action of a spring (not shown) acting on the pawl 280, located in the deepest part of the two recesses and in this position the pawl 280 cooperates with the ratchet wheel 278.

The device furthermore comprises a one-way brake between the shaft 202 and a part 307, which is rigidly secured to the housing 200. This one-way brake, comprising rollers 308 housed in recesses having a slanting bottom in a part 306, rigidly seated on the shaft 202, prevents the shaft 202 from rotating in anti-clockwise direction, viewed from the left in Fig. 8. At a relative displacement of the pawl carrier 210 and the outlet 223 such that the driving clutch formed by the pawl 218 and the ratchet wheel 214 is disengaged in a manner to be described more fully hereinafter, the one-way brake provides that the shaft 202 cannot recur under the action of the resilient connection between the part 210 and the toothed wheel 224.

The operation of the gearing device shown in Figs. 8 to 14 will now be explained with reference to the diagrammatical Figure 15, in which the principle of the gearing device is illustrated.

It is assumed that the outlet 207 is not loaded and that the pawl 280 is located in the recess 310 in the periphery of the ratchet wheel 278. The positions of the pawl-selecting toothed wheels 260, 266 and 267 relative to the pawl carriers 208, 209 and 210 are then such that the pawl 222 occupies the operative postion, whereas the pawls 218 and 219 are lifted from the associated ratchet wheels owing to the positions of the studs on these pawls in the slit-shaped apertures in the pawl-selecting toothed wheels concerned. The input and the output of the gearing device are consequently coupled through the toothed wheels 206 and 213, the pawl 222, the pawl carrier 210 and the resilient clutch formed by the pairs of springs provided between the pawl carrier 210, the discs 224, 225 and the output. Owing to the large diameter of the toothed wheel 206 and the small diameter of the wheel 213, the input shaft 201 being driven, the output will have a higher speed, than if the output were driven in an otherwise similar manner through the toothed wheel 205, the wheel 212, the ratchet wheel 215, the pawl 219, the pawl carrier 209, the shaft 202, the pawl carrier 210, and so on, or through the toothed wheels 204 and 211, the ratchet wheel 214, the pawl 218, the pawl carrier 208, the shaft 202, and so on.

Figure 10:
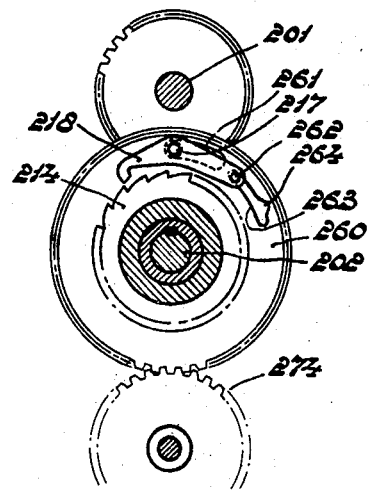
Fig. 10 shows part of the cross-sectional view taken on line X—X of Fig. 8.
Figure 11:
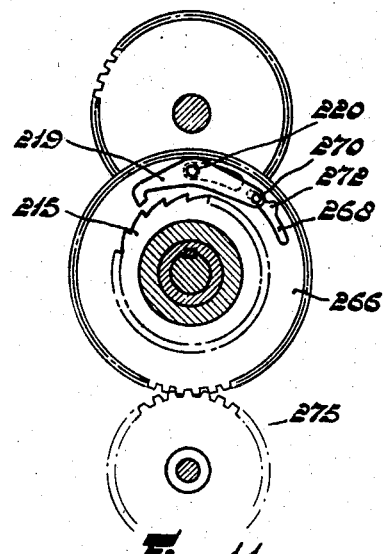
Fig. 11 is part of the cross-sectional view taken on the line XI—XI of Fig. 8.
Figure 12:
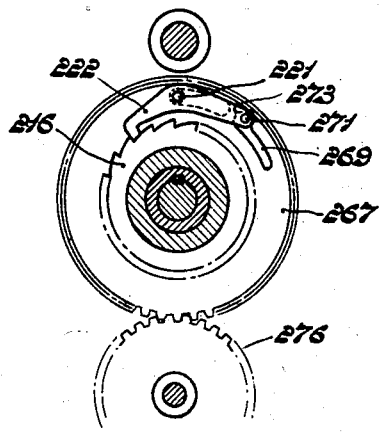
Fig. 12 is part of the cross-sectional view taken on the line XII—XII of Fig. 8.
Figure 13:
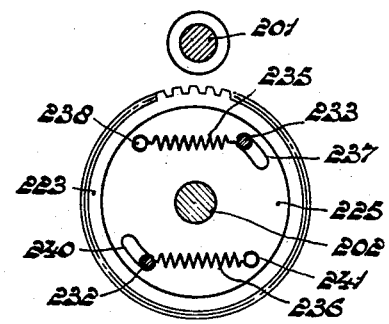
Fig. 13 is part of the cross-sectional view taken on the line XIII—XIII of Fig. 8.
Figure 14:
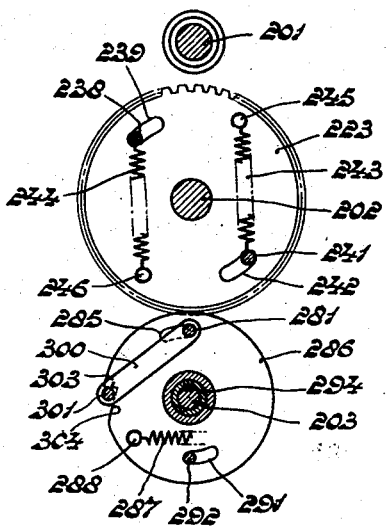
Fig. 14 is a cross-sectional view taken on the line XIV—XIV of Fig. 8.

It is now assumed that the torque exerted by the pre-tension of the springs 226 and 227 is smaller than the torque of the springs 235 and 236, the latter torque being smaller than the torque exerted by the springs 243 and 244. If the output 207 is loaded and if the load exceeds the torque exerted by the springs 226 and 227, the driving force will turn the shaft 202 with the pawl carrier 210 relatively to the output toothed wheel 223 in the direction of rotation, which is clockwise for the shaft 202 in Fig. 9, the studs 228 and 229 then moving towards the other ends of the slit-shaped apertures 230 and 231. This relative displacement of the pawl carrier 210 and the toothed wheel 223 results in a relative displacement of the toothed wheel 227 and the pawl 280, engaging the pawl wheel 278, on the one hand, and the toothed wheel 293 on the shaft 203, engaging the toothed wheel 223. Owing to this displacement, which means a counter clockwise rotation (Fig. 9) of the pawl wheel 278 with the pawl 280 and its support 282 relative to the stud 292, the disc 284 is taken along by the pawl shaft 281, the spring 287 being thus stretched. The disc 286 is withheld by the stud 292 on the wheel 293. When the pawl wheel 278 rotates further relatively to the wheel 293, the slanting edge 305 of the recess 303 in the disc 286, withheld by the stud, urges the stud 301 radially outwards, so that the pawl 280 is disengaged from the pawl wheel 278, after a given relative displacement of this pawl wheel and the wheel 293. Since now the connection between the pawl wheel 278 and the shaft 203 has been interrupted, the support 282 leaps back relatively to the wheel 23, owing to the contraction of the spring 287. The pawl 280 then reengages the pawl wheel 278 and finds its way into the recess 311. Then the shaft 203 has turned through an angle corresponding with the angle between the recesses 310 and 311 relative to the toothed wheel 277, driven by the pawl carrier 210; this rotation is transmitted through the toothed wheels 274 to 276 to the pawl-selecting toothed wheels 260, 266 and 267. This rotation of the pawl-selecting toothed wheels, which in Figs. 10, 11 and 12 is counter clockwise relative to the pawl carriers and their pawls, causes the slits 263, 268 and 269 in the pawl-selecting wheels to move relatively to the studs connected with the pawls 218, 219 and 222. Thus the pawl 222 is lifted, whereas the pawl 219 co-operates under the action of the helical spring with the ratchet wheel 215, since the rotation is such that now the widening 272 of the slit 268 at the area of the stud 270 finds its way to the pawl 219. Then the output shaft 207 is driven through the toothed wheel 205 on the shaft 201, the wheels 212 and 215, which are integral with one another, the pawl 219, the pawl carrier 209, the shaft 202, the pawl carrier 210, and so on. Owing to the difference in diameters of the toothed wheels 206 and 205 and the toothed wheels 213 and 212, engaging the former, the gear ratio between the input and the output has now varied. If the load of the output 207 further increases, the latter will, at a certain moment, become equal to the moment exerted by the pre-tension of the springs 235 and 236. These springs will then be stretched, so that again a relative rotation of the pawl carrier 210 with the shaft 202 and the toothed wheel 223 of the output occurs, the studs 232 and 233, secured in the disc 224, then moving in the slit-shaped apertures 237 and 240 in the disc 225. In a manner similar to the first described relative displacement of the pawl carrier 210 and the toothed wheel 223, the pawl 280 will be lifted out of the recess 311 and find its way in the recess 312. Thus the toothed wheels 274, 275 and 276 will again be rotated through a definite angle relative to the wheel 277, so that the pawl-selecting toothed wheels 260, 266 and 267 are also rotated in the initial direction relatively to the pawl carriers concerned. Owing to the latter rotation the operative pawl 219 is lifted, whereas the pawl 218, owing to the new position of the widening 264 relative to the stud 262, enters into the ratchet wheel 214. The pawl 222 remains in the lifted position. The gear ratio between the input and the output of the gearing device has then again been varied, so that at a constant speed of the input, the speed of the output is again reduced.

If the load of the output is further increased, so that also the springs 243 and 244 are also stretched and hence the relative rotation of the pawl carrier 210 and the output toothed wheel 223 increases further, the pawl 280 will again be lifted and find its way into the next following recess 313 in the ratchet wheel 278. Owing to this change the pawl-selecting toothed wheels 260, 266 and 267 are again rotated, so that the pawl 218 is lifted, whereas the pawls 219 and 222 remain in their lifted positions. Since the connection between the shaft 202 and the shaft 201 remains completely interrupted, the resilient coupling formed by the springs between the pawl carrier 210 and the output toothed wheel 223 tends to rotate back the shaft 202 with the parts seated thereon. However, this is prevented by the one-way brake between this shaft and the housing 200, formed by the parts 306, 307 and 308. Consequently the springs in the said resilient coupling remain stretched, so that the output shaft 207 is still exposed to a torque in the initial direction of rotation.

If, for any reason, the load of the outlet drops below the torque exerted by the springs 235 and 236, the latter will rotate the output in the initial direction of rotation relative to the stationary pawl carrier 210 and the shaft 202, coupled therewith. At this rotation, which implies a clockwise rotation (Fig. 9) of the toothed wheel 293, the stud 292 moves the disc 284 counter clockwise, whereas the pawl shaft 281 remains stationary and the disc 286 is withheld. Owing to the rotation of the disc 284 the stud 301 is urged radially to the outside by the slanting edge 305 of the recess 302, so that the pawl 280 is lifted. As soon as the pawl is free from the pawl wheel 278, the spring 287 contracts, so that the disc 286 follows the disc 284 and the shaft 203 is rotated relatively to the wheel 277 with the pawl wheel 278. Then the pawl 280 finds its way into the recess 312 and locks the shaft 203 again relatively to the toothed wheel 277. The rotation of the shaft 203 has produced a backward rotation of the pawl-selecting toothed wheels 260, 266 and 267 relative to the associated pawl carriers with pawls 218, 219 and 222 such that the pawl 218 again engages the ratchet wheel 214, so that the connection between the input shaft and the output shaft is restored.

If the load of the output drops to such an extent that also the springs 235 and 236 can re-occupy the initial positions, the decrease in relative displacement of the pawl carrier 210 and the output 223, 207 again results in a change-over of the pawl 280 which finds its way into the recess 311 in the pawl wheel 278. The pawl 218 is then disengaged and the pawl 219 is engaged. If, finally, the load of the output drops below the torque exerted by the springs 226 and 227, the relative rotation of the pawl carrier 210 with the shaft 202 and the outlet shaft 207 with the toothed wheel 223 is completely neutralized, the pawl 280 then entering again the recess 310 in a manner which will now be evident, so that the pawl 219 is lifted and the pawl 222 is made operative. Thus the condition from which we started in the above has completely been restored.

In the description of the gearing device shown in Figs. 9 to 15 it has been assumed that, in the position of rest, i. e. the unloaded condition of the device, the pawl 280 was located in the recess 310 of the ratchet wheel 278. In this position the pawl-selecting toothed wheels 260 and 266 keep the pawls 218 and 219 lifted, whereas the pawl 222 is operative. The speed of the output 207 is then maximum. It may be desired to reduce the speed of the shaft 207. This may be obtained by switching another gearing between the shaft 201 and the output. By means of the knob 297, which permits of displacing the sleeve 294 first axially to the right and then of rotating it, the pawl 280 can be moved into one of the other recesses of the pawl wheel 278, the pawl-selecting toothed wheels 260, 266 and 267 then taking up another position relative to the associated pawl carriers, so that in accordance with the recess into which the pawl 280 is moved, another of the pawls 218 and 219 or none of them is engaged. If, for example, the pawl 280 is moved into the recess 312, in this condition of the device, the pawl 218 co-operates with the ratchet wheel 214, whereas the pawls 219 and 222 are kept lifted. If, in this condition, the output is loaded with a torque exceeding the torque exerted by the springs 226 and 227, a relative rotation of the parts 210 and 223 occurs and is transmitted by the toothed wheels 277 and 293 to the system formed by the pawl 280 and the discs 284 and 286. Thus the pawl 280 is moved from the recess 312 into the recess 313, so that in the manner described above the pawl 218 is lifted and the one-way brake between the shaft 202 and the housing 200 becomes operative and keeps the connection between the input and the output of the device interrupted until, owing to a decrease in load of the output, the output is rotated in the initial direction of rotation under the action of the springs 226 and 227 and the pawl 218 is re-engaged.

In the embodiments of the gearing device according to the invention described above the driving clutches between the various gearings and the auxiliary member or the auxiliary members are formed by pawl ratchets. However, as an alternative, other clutches may be used, for example, clamping tape clutches, claw clutches, plate clutches and electromagnetic clutches. With the last-mentioned kind of clutches the relative displacement of the auxiliary member or the auxiliary members and the output may be used for changing over electrical switches, through which the clutches are controlled.

The gearing device according to the invention having a plurality of stages, of the kind used in the embodiments shown in Figs. 8 to 15, may be used in vehicles having wheel driving and in hoisting devices. We are, in fact, concerned here with an automatic gear box, in which change-over to another gear takes place in accordance with the load of the gearing device and hence of the driving mechanism. This may have advantages over the conventional automatic gear boxes used in vehicles, in which the change-over takes place in accordance with the speed of rotation.

A multi-stage gearing device according to the invention may, as an alternative, be constructed to be such that automatic change in the gearing ratio is possible for the forward as well as for the opposite direction of movement.

Figure 16:
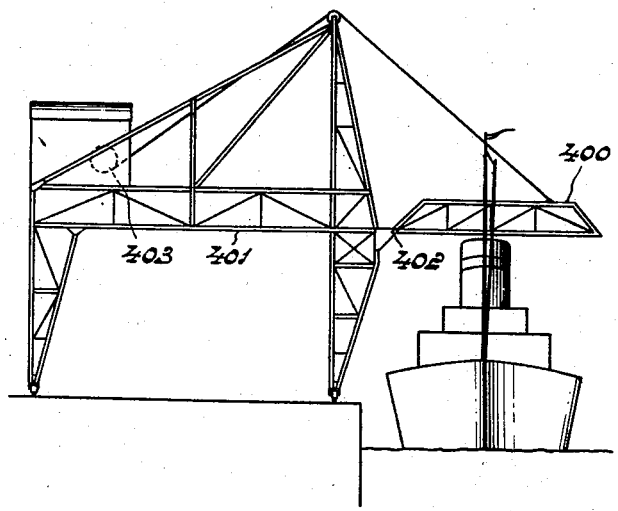
Fig. 16 shows, finally, in a diagrammatical view a movable loading bridge, in which a gearing device according to the invention having a plurality of variable gearings may be used successfully.

Apart from the use of the gearing device according to the invention in hoisting apparatus, reference is made to its use in movable loading bridges of the kind frequently used on discharging berths. Such a loading bridge is shown diagrammatically in Fig. 16. It is often necessary to lift a terminal part 400 of the loading bridge 401 extending over a ship to be loaded or discharged in order to allow the loading bridge to pass a mast, the bridge of the ship or another obstacle. This terminal piece is lifted by causing it to turn about a horizontal shaft 402 at the junction with the further part of the loading bridge. The force required for this purpose varies strongly with the position of the terminal piece, since the moment exerted by the force of gravitation decreases strongly with a steeper position of the terminal piece. In order to minimize the loss of time involved in lifting this terminal piece, it is advantageous to adapt the speed of hoisting to the hoisting force available. This may be automatically effected by driving the hoisting drum or other part 403 moving the terminal piece through a multi-stage gearing device according to the invention.

What we claim is:

1. A gearing device with automatic changeover of the gear ratio between the input driving part and output driven part comprising a plurality of gearings, means coupling said input driving part separately and sequentially through each of said gearings to said output driven part, said coupling means comprising a plurality of clutches, an auxiliary member, resilient means connecting said auxiliary member to said output driven part, said output driven part being driven through one of said clutches and when loaded in excess of a predetermined limit value determined by said resilient means said auxiliary member is displaced by the driving force of the input driving part relatively to said output driven part against the force of said resilient means, and means by which each of said operative clutches is disengaged when said auxiliary member is displaced relative to said output driven part and another of said clutches is made operative, a connecting element for linking said coupling means to said output driven part, said coupling means coacting with said connecting element for engaging and disengaging said clutches in sequence.

2. A gearing device as set forth in claim 1 further comprising a plurality of springs wherein said coupling means and said connecting element are kept by spring force in two extreme positions if the auxiliary member and said output driven part have not been displaced relatively to one another, said spring action being such that during the transition from one extreme position to the other extreme position an intermediate position is passed.

3. A gearing device as set forth in claim 1 further comprising at least one toggle spring, said spring engaging said coupling means and said connecting element, one end of said spring being secured to said output driven part whereby this point of connection is displaced upon a predetermined relative displacement of the auxiliary member and said output driven part due to load variation.

4. A gearing device with automatic changeover of the gear ratio between the input driving part and output driven part comprising a plurality of gearings, at least two intermediate driving parts, means coupling said input driving part separately and sequentially through each of said gearings to said output driven part, said coupling means comprising a plurality of clutches, an auxiliary member, resilient means connecting said auxiliary member to said output driven part, said output driven part being driven through one of said clutches and when loaded in excess of a predetermined limit value determined by said resilient means said auxiliary member is displaced by the driving force of the input driving part relatively to said output driven part against the force of said resilient means, and means by which each of said operative clutches is disengaged when said auxiliary member is displaced relative to said output driven part and another of said clutches is made operative, said two intermediate driving parts moving in opposite directions, a plurality of coupling elements for coupling each of said intermediate driving parts with said auxiliary member, said coupling elements co-acting with one another in a manner such that when one clutch is disengaged the coupling element thereof moves the coupling element of another clutch into operating position before the first-mentioned coupling element has moved to an extent whereby said one clutch has been disengaged.

5. A gearing device as set forth in claim 4 further comprising blocking means for said output driven part, said blocking means being externally controllable and adapted to block the output driven part alternately for one and for the opposite direction of movement.

6. A gearing device as set forth in claim 4 further comprising blocking means for said output driven part, said blocking means including a stud, a spring, a separate part, a one-way brake, and two locking lugs seated a predetermined distance from each other on said stud, said lugs being adapted to co-act alternately with said separate part which is coupled with said output driven part through said one-way brake by displacing said stud against the force of said spring.

7. A gearing device as set forth in claim 4 further comprising blocking means for said output driven part, said blocking means including two locking lugs, a stud, a spring and a stop on said output driven part, said locking lugs being seated a predetermined distance from each other on said stud and being displaced against the force of said spring, said lugs co-acting alternately with the stop on said output driven part, and said lugs being rotatably supported by said stud in a manner such that they can block said output driven part from movement in opposite directions.

8. A gearing device as set forth in claim 4 further comprising blocking means for said output driven part, said resilient means connecting said auxiliary member and said output driven part being a series-connection of springs having different pre-tensions, each of said springs due to said blocking means being stretched through a definite path.

9. A gearing device as set forth in claim 4 further comprising means for selectively controlling said coupling means to said output driven part, said selecting means co-acting with said coupling means of said clutches to operate said clutches sequentially when said selecting means moves relatively to said auxiliary member due to the relative displacement of said auxiliary member in relation to said output driven part.

10. A gearing device as set forth in claim 4 further comprising means for selectively controlling said coupling means relative to said output driven part, a locking device between said selection means and said auxiliary member which is operative in each position of the selection means relative to said auxiliary member, a resilient coupling, said selection means being connected with said output driven part through said resilient coupling operating in opposite directions, means for disengaging said locking device after a certain displacement of said selection means relative to said auxiliary member, said selection means being displaced by said resilient means intermittently relative to said auxiliary member, said displacement disengaging one clutch and engaging another clutch.

11. A gearing device as set forth in claim 4 further comprising means for selectively controlling said coupling means relative to said output driven part wherein the position of rest of said selection means relative to the output driven part is adapted to be adjusted such that in the unloaded condition of the device one of said clutches to be chosen at will may be maintained in the operative position.

12. A gearing device as set forth in claim 4 further comprising means for selectively controlling said coupling means to said output driven part, a locking device between said selection means and said auxiliary member which is adapted to lock said auxiliary member against reverse movement thereof after the last of the series of clutches is disengaged due to a predetermined displacement of said output driven part, said locking being interrupted when the displacement of the output driven part relative to the auxiliary member is decreased and said last clutch is reengaged.

13. A gearing device as set forth in claim 4 wherein said clutches are so arranged that upon an increase in the relative displacement of said auxiliary member and said output driven part said clutches are successively and sequentially engaged to corresponding intermediate driving parts, the speed of which is decreasingly lower upon increase of said relative displacement, and increasingly higher upon decrease in said relative displacement.

14. A gearing device as set forth in claim 4 wherein said driving parts are shafts and said coupling elements are rotatable pawls supported by said auxiliary member.

References Cited in the file of this patent

UNITED STATES PATENTS

| | | |
|---|---|---|
| 1,380,868 | Enard | June 7, 1921 |
| 1,428,326 | Fay | Sept. 5, 1922 |
| 2,341,946 | Richards | Feb. 15, 1944 |
| 2,520,352 | Wuetig | Aug. 29, 1950 |
| 2,524,342 | Descendre | Oct. 3, 1950 |
| 2,540,858 | Behn | Feb. 6, 1951 |